No. 670,122. Patented Mar. 19, 1901.
S. W. WARDWELL, Jr.
MEANS FOR WINDING HEAVY CORDS.
(Application filed Apr. 22, 1899.)
(No Model.) 7 Sheets—Sheet 1.

INVENTOR
Simon W. Wardwell Jr.
BY
ATTORNEYS.

WITNESSES

Fig. 7

No. 670,122. Patented Mar. 19, 1901.
S. W. WARDWELL, Jr.
MEANS FOR WINDING HEAVY CORDS.
(Application filed Apr. 22, 1899.)
(No Model.) 7 Sheets—Sheet 6.

Fig. 10.

WITNESSES
Arthur A. Fisher
Philip Farnsworth

INVENTOR
Simon W Wardwell Jr
BY
Foster & Freeman
ATTORNEYS.

UNITED STATES PATENT OFFICE.

SIMON W. WARDWELL, JR., OF PROVIDENCE, RHODE ISLAND, ASSIGNOR TO THE UNIVERSAL WINDING COMPANY, OF PORTLAND, MAINE.

MEANS FOR WINDING HEAVY CORDS.

SPECIFICATION forming part of Letters Patent No. 670,122, dated March 19, 1901.

Application filed April 22, 1899. Serial No. 714,083. (No model.)

*To all whom it may concern:*

Be it known that I, SIMON W. WARDWELL, Jr., a citizen of the United States, residing in the city and county of Providence, in the State of Rhode Island, have invented certain new and useful Improvements in Means for Winding Heavy Cords, of which the following is a specification.

My invention relates to machines for winding cords, threads, &c., in which there is a rotating spindle and reciprocating guide; and my invention consists in certain means for operating and varying the action of the guide to build up cops of different lengths, with the cords laid in successive spirals, and in certain details of construction and arrangement and in certain stop and tension devices, all as fully set forth hereinafter and as illustrated in the accompanying drawings, in which—

My improved apparatus is intended more especially for the winding of that class of cops in which there are successive concentric layers each consisting of successive reversed coils or helices of thread extending to and crossing each other adjacent to and also between the ends of the cop, and the said apparatus is provided with a rotating spindle or cop-holder and a reciprocating guide, the eye or delivery-point of which is at the point where the guide makes contact with the periphery of the cop, with means for imparting the proper movements to these parts, including means whereby each coil or helix of thread is crossed and laid parallel to one already deposited in the building up of the cop. Heretofore in this class of apparatus the gainer or increment devices have been of a character to vary the relative speed of movement of the rotating cop and a reciprocating guide. I have discovered that I can secure substantially the same result and avoid the use of more or less complicated and expensive mechanism by providing means for varying the throw or traverse of the thread-guide, and that by this means also I can wind cops of different lengths on the same machine.

The construction of the apparatus shown in the drawings is intended more especially for winding heavy twine or cord—such, for instance, as binding-twine.

The machine, as shown, consists of a frame A, of any suitable construction, supporting the winding-spindle or cop-holder $w$, which is driven by or connected to a shaft W, and of a swinging frame F, which supports the guide I, and also the devices which drive or impart reciprocation to the said guide. These devices are of such a character that the winding-spindle will rotate one or more times at each traverse of the guide, whereby the thread is laid in helices which are crossed by the reverse movements of the guide, and I provide for winding cops of different lengths with any desired number of turns in each helix by so constructing the guide-operating devices that the traverse of the latter may be extended or contracted, as desired. This particular structure is both novel and useful. By supporting the guide-operating devices on the swinging frame the guide alone is reciprocated, and it can therefore be made of comparatively small size and the need of reciprocating other heavy connections is avoided, thereby enabling the guide to be run at higher speed than would otherwise be the case. In addition to this the guide owing to its compactness is very strong and rigid and well adapted to resist the strain and wear incident to winding heavy cord. There is a distinct advantage in swinging the guide, with its actuating mechanism, toward the winding-spindle or cop rather than the reverse. By either method, however, contact would be maintained between the cop and guide, and to this extent one method would be the equivalent of the other; but by means of my peculiar and distinctive arrangements of parts I have so condensed and compacted the guide and its actuating mechanism that there is but a small mass to be moved and that mass does not vary, so that it can be readily counterbalanced to swing freely.

Figure 10:
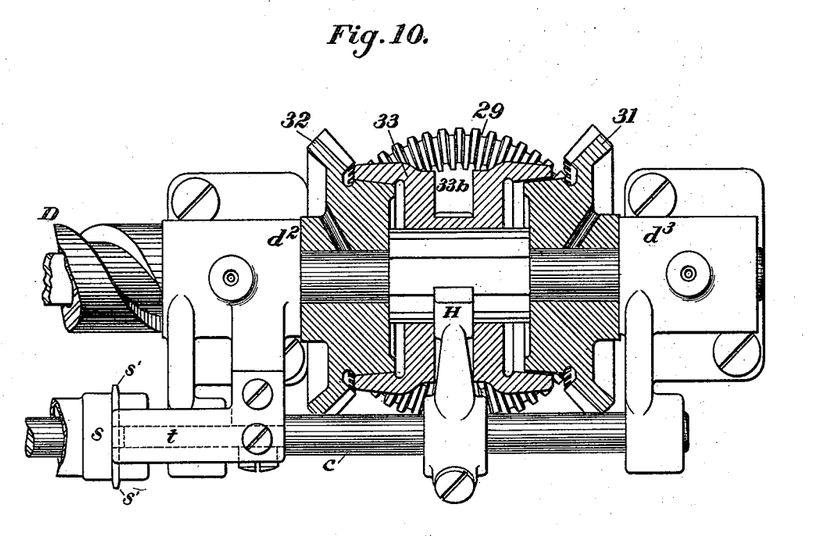
Figs. 10 and 11 are modifications of the structure.
Figure 11:
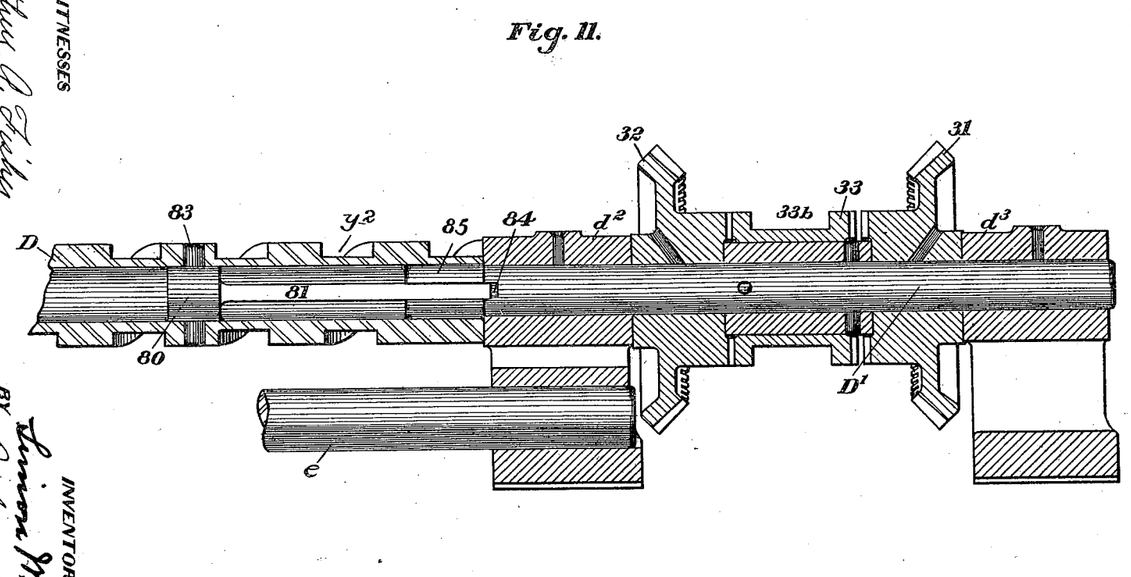

Different means may be employed for reciprocating the guide and varying the extent of reciprocation; but in the construction shown I have provided a propelling-screw D, having an open thread—that is, with the turns of the thread separated instead of meeting as usual, and turning in bearings $d'\ d^2\ d^3$, with a guide-carrier J, supporting the guide and reciprocated by said screw, together with means for reversing the screw, to alter the direction of travel of the guide. This reversing may be effected by the contact of the guide or its carrier with shifting devices when the guide reaches the end of its traverse. The screw D may be integral with the screw-shaft D', or, as shown in Fig. 11, the two parts may be separately connected. As shown in the drawings, the screw D is made with a tubular end in which is fastened the block 80, which may be integral with a long tongue 81. The end 85 of the shaft D' extends into the tubular end of the screw D, serving to support and center said screw, while the tongue 81 extends into a slot or groove 84, cut in the end 85 of the shaft D'. The long tongue 81 while serving to drive the screw D from the screw-shaft D' also serves as a torsion-spring to relieve the shock incident to the sudden reversal of motion of the screw. Incidentally this form of joint serves to eliminate the tendency of the screw and shaft to bind, owing to inaccuracy in the alinement of the three bearings $d'$, $d^2$, and $d^3$. Further, both the screw and guide can be removed without in any way disturbing the clutch mechanism and accompanying gearing. As shown, the screw-spindle D' supports two beveled gears 31 32, turning loosely on said spindle, and an intermediate clutch-sleeve 33, each end of which is adapted to engage with either one of the adjacent gears, the said sleeve sliding on but turning with the screw-shaft. As shown in Figs. 1, 3, 5, and 11, the clutch-faces are provided with teeth; but frictional engaging faces may be employed, as in the modification shown in Fig. 10. With both of the beveled gears 31 32 engages a driving-wheel 29, whereby the said gears are turned continuously in reverse directions, so that by shifting the clutch member into engagement with one or other of said gears the screw-shaft is turned in one direction or the other.

One means of shifting the sleeve 33 consists of a shifter-rod $c$, sliding in projections in the bearings $d'\ d^2\ d^3$ and carrying an arm H, (see Figs. 3, 5, 7, and 10,) which extends into a peripheral groove $33^b$ in the clutch-sleeve 33, and which rod is provided with contact-pieces G G', arranged to be struck by a projection 70, extending from the carriage J.

Figures 5, 6:
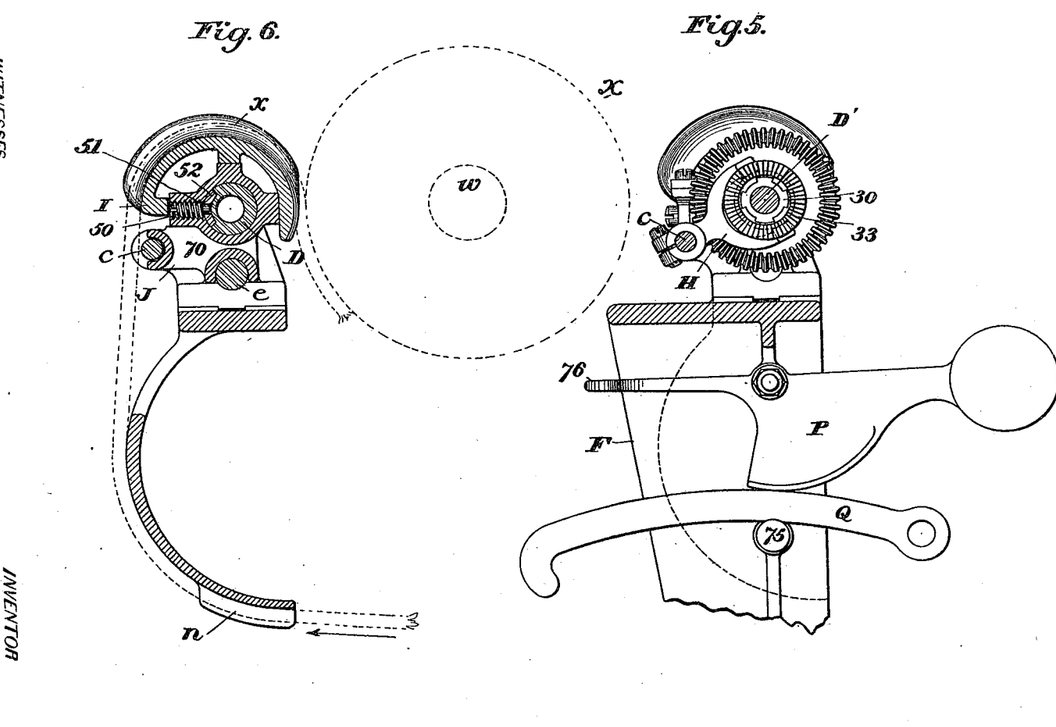
Fig. 5, a section on the line 5 5, Fig. 3, looking in the direction of the arrow.
Fig. 6, a section on the line 6 6, Fig. 3, looking in the direction of the arrow.
Figure 7:
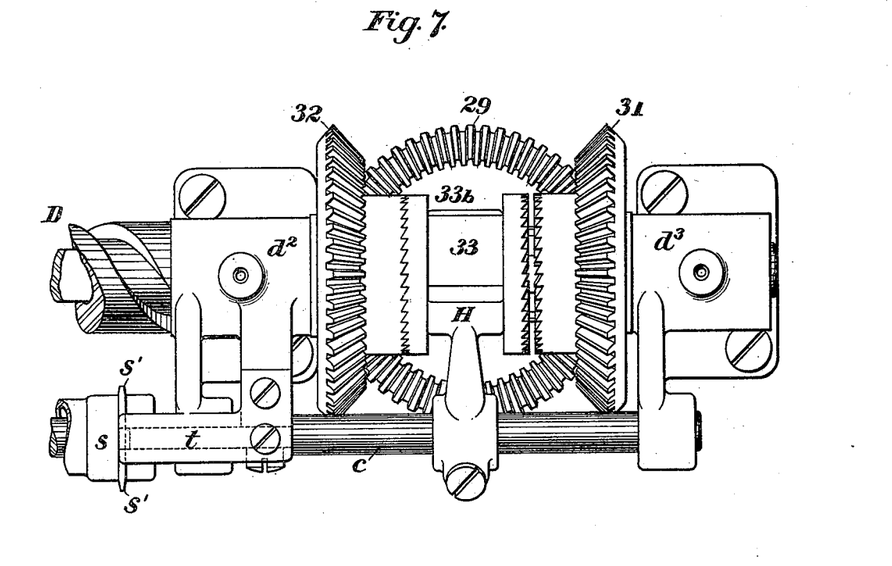
Fig. 7, an enlarged view of the shifting clutch devices.

The carrier J is recessed for the passage of the screw D and is provided with a screw 50, Fig. 6, terminating in a pin or teat 51, which engages with a shoe 52, adapted to the channel between the threads of the screw, whereby the rotation of the latter causes the traverse of the carriage.

While the guide I may be of any suitable construction, I show in the drawings the form which I prefer for use with binder-twine, heavy cord, &c., and consisting of a bracket having ears 54, bolted to the carrier and provided with a curved channel or groove $x$ for receiving the cord, the said channel being smooth to avoid friction and extended so as to deliver the cord against the cop-holder or cop at the point where the guide would bear upon the periphery of the cop, the frame F having a counterweight 59, which tends to swing the upper part of the frame toward the cop, while permitting it to swing outward as the cop increases in size.

Figure 2:
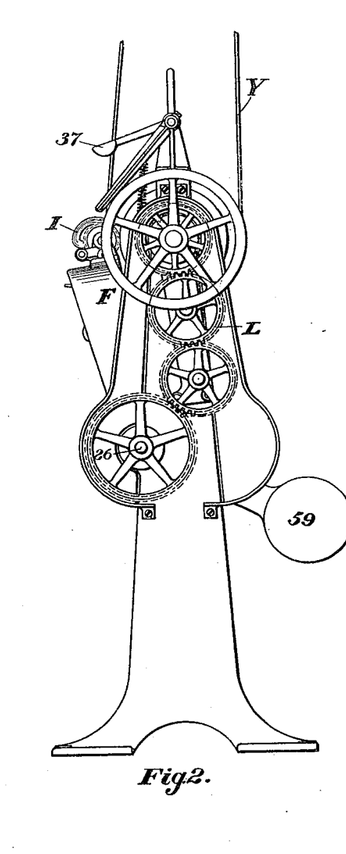
Fig. 2, a side elevation looking in the direction of the arrow $k$, Fig. 1.
Figures 3, 4:
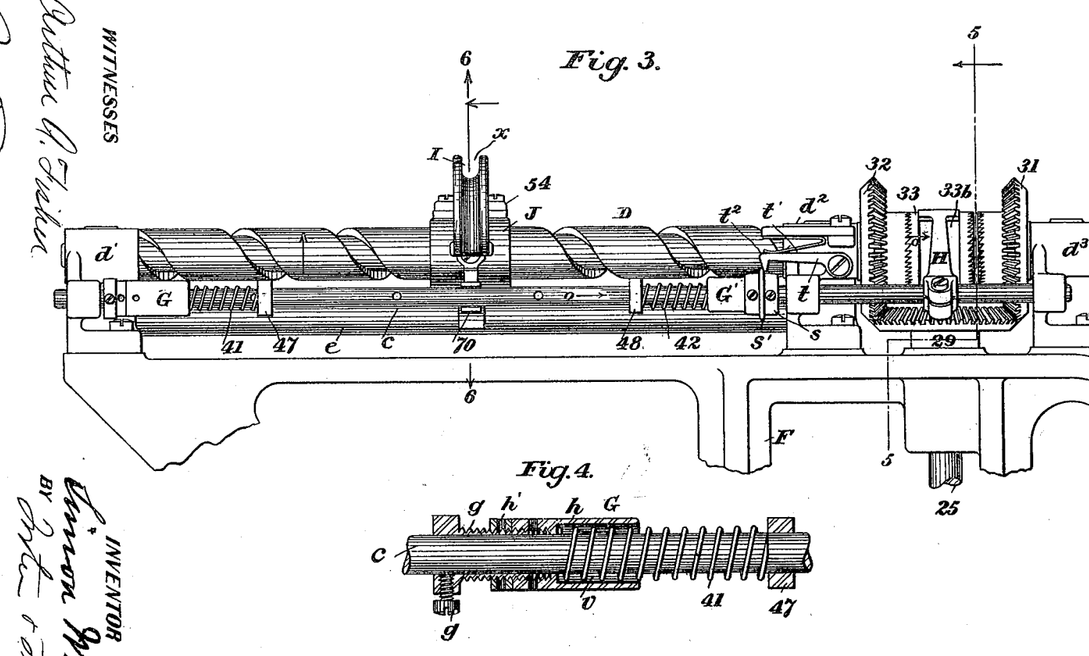
Fig. 3, an enlarged view showing the guide and operating parts adjacent thereto.
Fig. 4, a longitudinal section of part of the devices shown in Fig. 3 and drawn to a larger scale.

Any suitable means may be employed for driving the gear 29 upon the swinging frame F. As shown, the shaft 25 of said gear carries at the lower end a beveled pinion 28, which gears with the bevel-wheel 27 upon a shaft 26, which is driven by a suitable train of gears L, Fig. 2, from the shaft W. The frame F swings about the axis of the shaft 26 as a center, whereby the gears 27 and 28 are maintained in mesh at all positions of the frame.

In the operation of the machine the gear 29 rotates continuously in one direction, driving the two gears 31 and 32 in opposite directions, the screw D turning with the gear which is in engagement with the sleeve 33. Assuming the screw to turn in the direction of the arrow, Fig. 3, the carriage and its guide will be carried toward the contact-piece G' and on striking the latter will carry the shifter-rod $c$, together with the sleeve 33, in the direction of the arrow $o$, engaging the gear 31 with the screw-shaft and reversing the direction of rotation of the screw.

It will be seen that the length of the cop and the number of turns in each helix will depend upon the extent of traverse of the guide and that by setting the contact-pieces G G' in different positions cops of different lengths may be wound on the same machine. A change in the length of traverse therefore causes a corresponding change in the number of rotations of the spindle per traverse. If when there are four rotations during a four-inch traverse the throw be changed from four inches to five, the number of rotations made by the spindle during one traverse of the guide will be increased to five. If, for instance, there are to be two turns of the cord or thread around the core or cop in each helix, the guide is carried to one end of the cop-holder and one of the contact-pieces G G' is set close to the projection 70, and the holder is then rotated so as to make two complete rotations, carrying the guide along the holder to a position circumferentially in line with the starting-point of the helix at the opposite end. If the movement of the guide was now reversed, a reverse helix would be laid and the guide would be brought to the exact position in respect to the holder at which it started and the next helix would be laid or piled directly upon the first. For this reason the contact-piece which is last adjusted is not brought against the projection 70 and secured after the cop-holder has made two complete rotations, but is so adjusted and secured that the cop-holder, in addition to two complete rotations, is turned a small fraction of a rotation, so as to carry the thread and reverse the guide beyond a point circumferentially in line with the starting-point at the opposite end. It therefore follows that the shifter-rod will not be moved and the rotation of the screw reversed until the cop has made a little more than two complete revolutions, counting from the point where the thread starts at one end, and as a result each helix starts from one end of the cop at a point circumferentially beyond that at which the preceding helix started from the opposite end, and the thread of each helix at the ends of the cop is therefore laid across the thread of the helix before laid and then bent back and laid alongside of the latter.

While I have referred to the cop as making more than two complete turns, it will be understood that practically the same result will be secured if the traverse is slightly reduced or the guide reversed just before reaching the point at which the cop completed a rotation.

It will be seen that there are practically two adjustments for the contact-pieces G G'. One of these determines the general length of the cop. The other is a fine adjustment extending or reducing the theoretical traverse of the guide just so far as may be necessary to carry the thread across the thread of the helix previously laid and reverse it at a point circumferentially slightly ahead of or behind that where the helix was started at the opposite end. One construction providing for such adjustment is shown in the drawings, (best seen in Fig. 4,) where the contact-piece consists of two parts g h, the latter adapted for fine adjustment on the part g, while the former, which is tubular, slides upon the shifting bar c and may be secured at any point thereon by a set-screw g'. As shown, the part g is threaded to receive the part h, which may be adjusted by turning it upon the part g and then securing it in place by a jam-nut h'. In practice the part g is adjusted, together with the part h, to such position that the projection 70 on striking the contact-piece will cause the reversal of the guide exactly at the point where one or more rotations or fractions thereof are completed and in line with the point from which the laying of a helix started at the opposite end of the cop. The part h is then turned, so as to cause the guide to be reversed slightly before or slightly after reaching the point upon line with the starting-point at the opposite end. As the guide cannot be reversed until the clutch-sleeve 33 is first disengaged from the hub of one gear and then engaged with the hub of another, and as it is desirable both to limit the period of shifting the sleeve and also to prevent it from at any time stopping midway between the two engaging faces, I provide means whereby to hold the sleeve in one position until the time of reversal and whereby to store up power that will positively and quickly shift it the moment the reversal should take place.

With a clutch of the form herein described the reversing of the attached mechanism comprises the following operations: The clutch must be disengaged from one of the gears 31 or 32 and moved across the space intervening between the end of the clutch and the opposite gear to then engage the latter. The amount of space or "play" between the clutch and the two gears is reduced to the smallest practicable amount in order to render the reversal as nearly instantaneous as possible; but there is a certain amount of such play, and it is obvious that between the time of disengaging from one gear and engaging with the other the clutch occupies a neutral position in which it is not operatively engaged with the actuating mechanism. To insure that the clutch shall immediately and without fail engage with one of the gears 31 or 32 when disengaged from the other, I employ the two springs 41 and 42, which are alternately compressed as the guide approaches either end of its travel by the contact of the guide-carrier with a collar 47 or 48 sliding on the rod c to store up power to assist and accelerate the shifting of the clutch. Means are further provided for restraining these springs from action until the clutch has been positively disengaged from one of the gears. As illustrating one means for securing this result I show in Fig. 3 means for holding the rod c temporarily against longitudinal movement. Thus there is an arm or pawl t, having at its extremity a triangular toe $t^2$, the inclined faces of which are adapted to the opposite inclined faces of a rib s' upon a block s, secured to the rod c. A spring t' tends to exert a pressure to resist the upward movement of the pawl. When the guide-carrier J presses one of the collars 47 or 48 in contact with either of the contact-pieces G or G' to shift the rod c, the rib s' forces the pawl t upward and releases the contact-piece. Just as the top of the rib s' passes under the point of the toe $t^2$ the clutch is disengaged from its gear, and the spring 41, (or 42,) aided by the wedging action of the toe $t^2$ on its downward movement, forces the clutch quickly over into engagement with the opposite gear.

Figure 1:
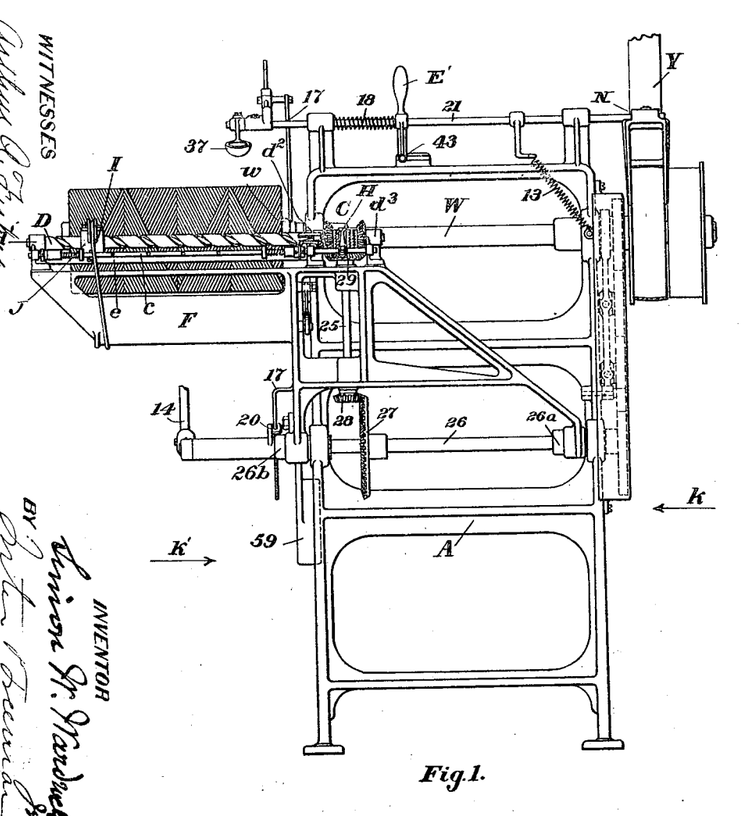
Figure 1 is a front elevation of a winding-machine embodying my improvements.

The stopping devices may be of any suitable character. As shown in Fig. 1, there is a driving-belt Y, with a belt-shifter N upon a rod 21, to which is attached a handle E', the end of which engages with a shoulder 43, thereby preventing a spring 18 from shifting the rod and the belt-shifter. When, however, the rod is turned, the handle is disengaged from the shoulder and the spring 18 moves the rod longitudinally, carrying the belt onto the loose pulley. This rocking of the shaft may result from the contact of the cop with an arm 37, rotatively adjustable on the shaft 21, so that the machine is stopped when the cop reaches the proper size. The rocking of the shaft also results from other causes, hereinafter described. It is also essential to stop the machine when the supply becomes exhausted or when the cord breaks, or in case there is resistance to the feed of the cord—as, for instance, results from the tangling of the latter. The stopping in the latter case is especially important, as an obstruction to the movement of the cord will either cause it to break or if the cord is strong will strain or break the machine. To stop the machine under these conditions, I incorporate in the machine structure the devices illustrated in Figs. 8 and 9. As shown in said figures, an arm 22, attached to the shaft 21, carries at the end a guide-pulley 23, over which the cord passes from a supply S and down through a tension device N'. If there is any obstruction to the movement of the cord, the arm 22 will be drawn down, rock the shaft 21, and stop the machine. A spring 13 tends to rock the shaft to raise the arm 22. There is another arm 14, carrying a pulley 15 and connected with a spring 16, which tends to draw the outer end of the arm downward. The pulley 15 lies upon that part of the cord between the tension device and the cop, so that if the cord should break or the supply become exhausted the arm 14 will fall and, through suitable connections, stop the machine. As shown, a rod 17, connected with the arm 22, passes through an eye 20 on the arm 14 and is provided with a stop 19, with which the eye comes in contact when the arm 14 falls, thereby drawing down the arm 22, rocking the shaft 21, and stopping the machine.

Figures 8, 9:
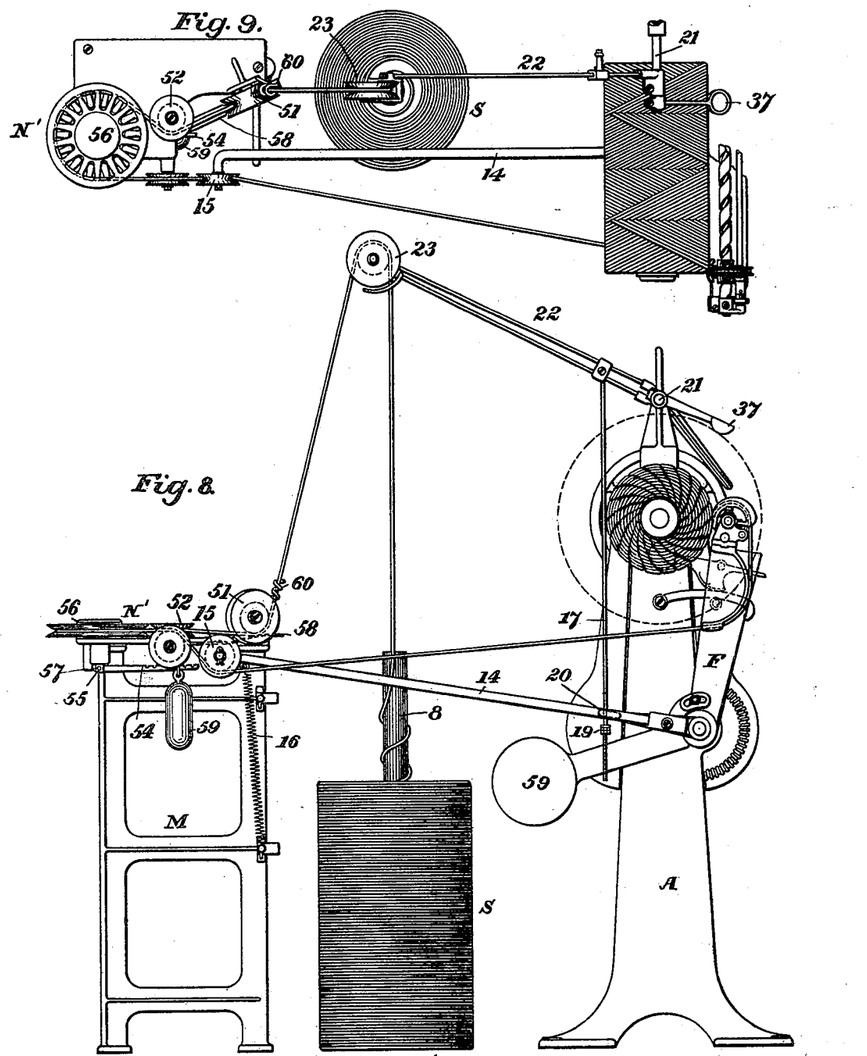
Fig. 8, an end view of the machine and showing the tension and stop devices looking in the direction of the arrow $k$, Fig. 1.
Fig. 9, a plan view of part of the devices shown in Fig. 8.

While any suitable form of tension devices may be used, I have found that shown in Figs. 8 and 9 to be particularly effective. In these figures, M is the frame of the device, located at a suitable distance from the machine and carrying two grooved pulleys 51 52, which conduct the cord to and from a horizontal tension-wheel N'. The latter has tension applied thereto in any suitable manner—as, for instance, by means of a tension-disk 56 upon a pin extending through the shaft of the wheel and secured to a lever 54 beyond its fulcrum 55, a weight 59 being adjusted on the lever. Preferably the under side of the disk 56 is provided with leather or other material that will secure a steady frictional resistance to the rotation of the wheel N'.

Suitable devices are employed to hold the cord in the groove of the guide-wheel 51—as, for instance, a guide-eye 60—and to prevent the cord from dropping from the groove when tension is relaxed I employ a spring-finger 58, extending into the lower part of the groove.

An ordinary feather might be used to prevent the rotation of the clutch-sleeve 33 on the shaft D'. As shown in Fig. 5, however, there is a sleeve 30 secured to the shaft D', with external longitudinal grooves receiving corresponding internal projections on the sleeve 33. The prevention of the return of the frame F after having been forced outward to any extent, for reasons set forth in my Letters Patent No. 531,081, is secured by a cam P, pivoted to the frame F, Fig. 5, and engaging an arm Q, pivoted to the main frame and bearing on a lug 75 on the frame F. A finger 76 extends from the cam, so that the latter can be lifted by pressing on the finger to permit the frame F to swing inward. These features I do not here claim.

The frame F below the screw is curved or rounded, as shown in Figs. 1 and 6, so that the cord can be conducted from one side of the frame beneath the rounded face thus provided and to the guide, following a general curved course without abrupt bends or friction, a rib $n$ preventing the cord from being drawn from the end of the said curved face.

While I have shown means for carrying the swinging frame, together with the guide and its operating devices supported on said frame, toward the cop to preserve the contact between the cop and guide at the point where the cord passes from the latter, it will be evident that an equivalent would consist in means for carrying the cop against the guide and toward its operating devices and a stationary frame supporting them.

Instead of a single thread the screw may have a second thread, as indicated at $y^2$, Fig. 11, so that when one is worn the shoe 52 may be inserted in the other.

Heretofore in machines for winding cops of the general character above described the guide or member which lays the cord on the package has been reciprocated by means of a cam. For winding cops of medium or small size this construction is effective; but when heavy thread or cord and large cops are wound many conditions arise which render the use of a cam inexpedient. For instance, in such cases the cams are necessarily large and on account of their weight cannot be driven at the high speed sometimes required, while a separate cam is required for each length of cop or package wound.

It will be seen that in the above-described machine I dispense with the use of a cam and operate the guide by devices comparatively small in size, light in weight, and capable of winding cops of different lengths.

Without limiting myself to the precise construction shown and described, I claim—

1. In a machine for winding cops, a spindle, a guide, a frame carrying the guide and movable to and from the spindle to maintain the guide in contact with the cop, and a guide-operating screw carried by said frame, and means for reversing the screw to reverse the travel of the guide, substantially as set forth.

2. In a machine for winding cops, a spindle, a guide, a frame carrying the guide and movable to and from the spindle to maintain the guide in contact with the cop, a guide-operating screw carried by said frame, means for reversing the screw to reverse the travel of the guide, and means for adjusting the relative movements of the spindle and guide to lay the thread in crossed helices with succeeding helices parallel and close together in the same layer, substantially as set forth.

3. The combination in a winding-machine, of a rotating cop-holder, a reciprocating guide adapted to lay the cord in openly-coiled helices having each one, two or more turns or fractions of a turn, means for varying the length of traverse of the guide to vary the number of turns in each helix, and to regulate the relative action of the spindle and guide to regulate the distance between succeeding parallel helices, substantially as described.

4. The combination in a winding-machine, of a rotating cop-holder, a reciprocating guide adapted to lay the cord in open crossed helices, and means for varying the number of rotations of the spindle per traverse of the thread-guide by changing the length of traverse of the guide to lay each helix parallel to and beside the next preceding helix laid in the same direction.

5. The combination in a winding-machine, of a rotating holder, a guide, a screw for reciprocating the guide, and means to adjust the time of reversal of the screw relative to the number of rotations of the rotating holder to control the length of traverse of the guide, and thereby the relative positions of the helices in which the material is wound, substantially as set forth.

6. A winding-machine provided with a rotating cop-holder, a frame movable to and from the holder, a guide reciprocating in a line parallel to the face of the cop on said frame, a guide-operating screw, and means for reversing the same carried by the frame, substantially as set forth.

7. A winding-machine provided with a rotating cop-holder, a frame movable to and from the holder, a reciprocating guide and guide-operating devices mounted on the frame to be moved with the frame away from the cop-holder by the increasing diameter of the package, substantially as described.

8. A winding-machine provided with a rotating cop-holder, a frame with reciprocating guide and guide-operating devices carried thereby and movable with said frame from the holder to preserve the contact of the guide and cop as the cop increases in diameter, substantially as set forth.

9. The combination in a winding-machine with a continuously-rotating winding-spindle, a frame adapted to be pressed back from the spindle by the increasing diameter of the cop, and carrying a reciprocating guide and guide-operating devices which derive their motion from the winding-spindle, of means also carried by the said movable frame for transforming the motion of continuous rotation transmitted from the winding-spindle, to a motion of reciprocation to operate the guide.

10. The combination in a winding-machine with a continuously-rotating winding-spindle, and a guide and guide-actuating devices which derive their motion from said winding-spindle, of means for transforming the motion of continuous rotation transmitted from the winding-spindle, to a motion of reciprocation to operate the guide, said guide-actuating devices and motion-transforming devices being supported to be moved outward from the spindle with the increasing diameter of the cop to maintain contact between the cop and the reciprocating guide.

11. The combination with the winding-spindle and reciprocating guide of a winding-machine, of means for varying the number of rotations of the winding-spindle per traverse of the guide, by changing the length of traverse of the guide, to regulate the distance between said parallel helices, substantially as described.

12. The combination with the guide of a winding-machine for laying the thread in open reversed helices, of means for moving the guide at uniform speed in both directions, means for mechanically reversing the movements of the guide, and means for varying the extent of travel of the guide to regulate the distance between succeeding helices in each layer, substantially as set forth.

13. The combination with the guide of a winding-machine for winding helically-wound cops, of a driving-screw, a continuously-driven gear 29, loose gears 31 and 32, intermediate clutch-sleeve turning with and sliding on the screw-shaft and adapted to be shifted to engage with either of the gears, a movable bar connected with the sleeve, contact-pieces adjustable on said bar to determine the nominal length of the package and adapted to be struck by a part of the guide, and means to further vary the nominal length of the package to regulate the relative positions of the helices in which the cord is laid, substantially as set forth.

14. The combination of the guide, screw, reversing-gear, and reversing-rod, and contact-pieces adjustable on the rod and each in sections, one section adjustable with respect to the other, substantially as set forth.

15. The combination with the guide of a winding-machine for winding helically-wound cops, of driving and reversing devices, contact-pieces arranged to be moved from the guide to operate the reversing devices and provided with means for slightly varying the throw of the guide to regulate the relative position of the helices in which the cord is laid, and a detent frictionally resisting the movements of the contact-pieces in either direction, substantially as described.

16. The combination with the guide of a winding-machine for winding helically-wound cops, of driving and reversing devices, contact-pieces arranged to be moved from the guide to operate the reversing devices and provided with means for slightly varying the throw of the guide to regulate the relative position of the helices in which the material is laid, a detent frictionally resisting the movements of the contact-pieces in either direction, and springs interposed between the contact-pieces and the part operating the same to insure the complete operation of the reversing devices, substantially as described.

17. The combination of the guide of a winding-machine, driving-screw, reversing-gear, contact-pieces and connections to shift the reversing-gear, detent, means for storing up power to complete the shifting of the reversing-gear, and means whereby the parts are operated to form layers composed of reversed open helices, and means whereby the time of shifting the reversing-gear may be slightly varied relative to the number of rotations of the spindle to vary the positions of the helices circumferentially, substantially as described.

18. The combination with the rotating cop-holder of a winding-machine, of a movable frame and a reciprocating guide, means for driving the guide, guide-reversing devices, and adjustable appliances for actuating and varying the action of the reversing devices to vary the length of travel of the guide, all carried by the frame, substantially as set forth.

19. In a winding-machine, a frame A, a winding-spindle W, and shaft 26 carried by the frame, a swinging frame F pivoted concentric with the shaft 26 and carrying a shaft 25 adapted to be maintained in operative connection with the shaft 26 in all positions of the frame F and carrying also the reciprocating guide and guide-operating devices, and means to restrain the frame from returning to the winding-spindle from any position to which it has been forced by the increasing diameter of the package wound, substantially as set forth.

20. In a winding-machine, a frame A, a winding-spindle W and shaft 26 carried by the frame, a swinging frame F pivoted concentric with the shaft 26 and carrying a shaft 25 adapted to be maintained in operative connection with the shaft 26 in all positions of the frame F and carrying also a screw, a guide propelled by the screw and devices operated from the guide for reversing the screw, and means for preventing the return of the guide toward the winding-spindle from any position to which it has been forced by the increasing diameter of the package.

21. The combination of a stationary and a pivoted frame, adapted to be swung back by the increasing diameter of the cop, a winding-shaft and cop-holder carried by one of the frames, a reciprocating guide, guide-driving devices, and means for reversing the guide-driving devices carried by the other, and a driving-pulley and gearing imparting movement therefrom to the devices of both frames, substantially as set forth.

22. The combination with the rotating cop-holder of a winding-machine, of a frame F movable to and from the holder, a screw parallel to the said cop-holder carried by said frame, means for turning and reversing the screw, and a guide driven by said screw, substantially as set forth.

23. The combination with the main frame, frame F, rotating cop-holder and reciprocating guide, of a rotatable wedge P and bearing 75 connected with one of the frames, and bearing-bar Q connected with the other, substantially as set forth.

24. The combination with the main frame, frame F, rotatable cop-holder and reciprocating guide, of a rotatable wedge P having a finger 76 and bearing 75 connected with one of the frames, and bearing-bar Q connected with the other, substantially as set forth.

25. The frame F carrying the thread-guide and provided with a curved bearing-face beneath the guide, substantially as and for the purpose set forth.

26. The combination with a winding-spindle, tight and loose pulleys connected therewith, a belt-shifter and a rod to operate the shifter, of a spring to shift the rod, a detent to prevent the operation of said spring and adapted to be disengaged by a rotary movement of said rod, and means for imparting to said rod a rotary movement, substantially as set forth.

27. The combination with a winding-spindle, tight and loose pulleys connected therewith, a belt-shifter and rod to operate the shifter, of a spring to shift the rod, a detent to prevent the operation of said spring and adapted to be disengaged by a rotary movement of said rod, and an arm adjustably connected to said rod and adjusted to make contact with the package wound to rotate said rod to shift the belt, substantially as described.

28. The combination with the cop-holder, reciprocating guide, belt-shifter, and rod to operate the belt-shifter, of a detent adapted to be disengaged by a rotary movement of the rod, an arm having at its extremity a guide-wheel over which the cord passes from the supply and whereby, in case of entanglement of the supply, said arm is caused to rotate the shipper-rod to disengage the detent, and a spring to lift said arm, substantially as described.

29. The combination in a winding-machine, of a cop-holder, reciprocating guide, belt-shifter, rod to operate the belt-shifter and tension devices, a spring to move the shifter-rod, a detent to prevent the action of the spring and adapted to be disengaged by a rotary movement of the rod, an arm 22 connected to said shaft and a spring to lift said arm, a horizontal arm 14 with a wheel at its extremity and adapted to be upheld by the tension of the cord as it is wound, and a rod 17 depending from the arm 22 and provided with a stop 19 to engage with the arm 14 whereby the shipper-rod 21 may be rotated, substantially as described.

30. The combination in a winding-machine, of a winding-spindle, an operating-screw and means for reversing its rotation, a guide-carrier carried on the screw and propelled thereby, and, separably connected with the carrier, a guide comprising a curved, grooved portion supported in a plane perpendicular to the axis of the winding-spindle, substantially as described.

31. The combination in a winding-machine, of a driving-screw D and driving devices therefor, a guide I, and guide-carrier J, carried on and propelled by the screw and movable with the screw from the winding-spindle with the increasing diameter of the cop, a rod C to act upon the driving devices to reverse the motion of the screw, contact-pieces G, G' one or both of which are adjustable in length to vary the space between them, against which the collars 47 and 48 are pressed by the projection 70 of the guide-carrier J at either end of its travel to positively shift the rod, a spring-pressed detent $t$ to engage the contact-piece G' to frictionally prevent the shifting of the rod $c$ until positively moved by the guide-carrier J, and the springs 41 and 42 to accelerate and complete the shifting of the rod after it has been positively moved by the reciprocating guide-carriers, substantially as described.

32. The combination in a winding-machine, of a driving-screw D having a tubular portion, a reciprocating guide I carried upon and propelled by the screw, a shaft D', by which the screw is driven, having a slotted end projecting within the tubular portion of the screw and supporting the latter, and a flat spring 81 fastened within said tubular portion of the screw and engaging the slotted end of the shaft D' to rotatively connect the latter with the screw and relieve the shock due to reversing the motion of the guide.

In testimony whereof I have signed my name to this specification in the presence of two subscribing witnesses.

SIMON W. WARDWELL, JR.

Witnesses:
EDWIN C. SMITH,
THOMAS M. CHILDS.